(12) United States Patent
Matteucci et al.

(10) Patent No.: US 9,169,367 B2
(45) Date of Patent: Oct. 27, 2015

(54) RADIATION CURED MEMBRANES DERIVED FROM POLYMERS THAT ARE CO-REACTIVE WITH AZIDE CROSSLINKING AGENT(S)

(71) Applicant: Dow Global Technologies LLC, Midland, MI (US)

(72) Inventors: Scott T. Matteucci, Midland, MI (US); Junqiang Liu, Midland, MI (US); Ahmad Madkour, Canton, MI (US); William J. Harris, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/422,008

(22) PCT Filed: Sep. 18, 2013

(86) PCT No.: PCT/US2013/060396
§ 371 (c)(1),
(2) Date: Feb. 17, 2015

(87) PCT Pub. No.: WO2014/047174
PCT Pub. Date: Mar. 27, 2014

(65) Prior Publication Data
US 2015/0218330 A1  Aug. 6, 2015

Related U.S. Application Data

(60) Provisional application No. 61/703,580, filed on Sep. 20, 2012.

(51) Int. Cl.
| | |
|---|---|
| *C08J 7/12* | (2006.01) |
| *B01D 53/22* | (2006.01) |
| *B01D 67/00* | (2006.01) |
| *B01D 71/58* | (2006.01) |
| *B01D 71/64* | (2006.01) |
| *C08J 3/24* | (2006.01) |

(52) U.S. Cl.
CPC .............. *C08J 7/123* (2013.01); *B01D 53/228* (2013.01); *B01D 67/0006* (2013.01); *B01D 67/0013* (2013.01); *B01D 71/58* (2013.01); *B01D 71/64* (2013.01); *C08J 3/24* (2013.01); *B01D 2323/08* (2013.01); *B01D 2323/30* (2013.01); *B01D 2323/34* (2013.01); *B01D 2323/345* (2013.01); *C08J 2375/04* (2013.01); *C08J 2375/06* (2013.01)

(58) Field of Classification Search
USPC .................. 522/146, 134, 1; 520/1
See application file for complete search history.

(56) References Cited

U.S. PATENT DOCUMENTS

| | | | |
|---|---|---|---|
| 4,197,133 | A * | 4/1980 | Zweifel et al. ................ 430/197 |
| 4,385,133 | A | 5/1983 | Alberino et al. |
| 4,522,975 | A | 6/1985 | O'Connor et al. |
| 4,655,807 | A | 4/1987 | Ohmori et al. |
| 4,894,339 | A | 1/1990 | Hanazato et al. |
| 5,167,899 | A | 12/1992 | Jezic |
| 5,494,228 | A | 2/1996 | Eaton et al. |
| 6,172,167 | B1 | 1/2001 | Stapert et al. |
| 6,656,252 | B2 | 12/2003 | Kita et al. |
| 7,297,394 | B2 | 11/2007 | Khemani et al. |
| 7,476,659 | B2 | 1/2009 | Hayashi et al. |
| 7,815,987 | B2 | 10/2010 | Mickols et al. |
| 7,882,963 | B2 | 2/2011 | Mickols et al. |
| 7,897,797 | B2 | 3/2011 | Emrick et al. |
| 8,002,120 | B2 | 8/2011 | Niu et al. |
| 8,163,814 | B2 | 4/2012 | Emrick et al. |
| 2008/0143014 | A1 | 6/2008 | Tang |
| 2008/0214743 | A1 | 9/2008 | Broos et al. |
| 2010/0126341 | A1 | 5/2010 | Matteucci et al. |
| 2013/0255490 | A1 | 10/2013 | Matteucci et al. |

FOREIGN PATENT DOCUMENTS

| | | |
|---|---|---|
| JP | 2009191121 | 8/2009 |
| JP | 2010005499 | 1/2010 |
| WO | 03053547 | 7/2003 |
| WO | 03080227 | 10/2003 |
| WO | 2007030791 | 3/2007 |
| WO | 2007099397 | 11/2007 |
| WO | 2008064857 | 6/2008 |
| WO | 2008101051 | 8/2008 |
| WO | 2008112833 | 9/2008 |
| WO | 2008121579 | 10/2008 |
| WO | 2012088077 | 9/2012 |
| WO | 2013043807 | 3/2013 |

OTHER PUBLICATIONS

Koros et al., Membrane-Based Gas Separation, J. Membrane Sci., 83, 1-80 (1993).

(Continued)

*Primary Examiner* — Ling Choi
*Assistant Examiner* — Jessica E Whiteley
(74) *Attorney, Agent, or Firm* — Edward W. Black

(57) ABSTRACT

The present invention appreciates that compounds comprising nitrogen-containing moieties that are at least divalent (e.g., urea, urethane, amide, etc.) can be reacted with azides using at least radiation energy to initiate the reaction between at least a portion of the compounds and the azides to form membranes that have surprisingly high selectivities for acid gases relative to nonpolar gases such as hydrocarbons. The membranes are also resistant to $CO_2$ plasticization and have high acid gas flux characteristics. The resultant membranes can be extremely thin (e.g., 10 micrometers or less), which promotes high permeability for the acid gas and can translate into high productivity on a scaled-up, industrial level.

10 Claims, 5 Drawing Sheets

(56) References Cited

OTHER PUBLICATIONS

Naiying Due et al. Azide-based Cross-Linking of Polymers of Intrinsic Microporosity (PIMs) for Condensable Gas Separation Macromolecular Rapid Communications vol. 32, No. 8, Mar. 11, 2011, pp. 631-636.
Sonnenschein et al., Encyclopedia of Polymer Science and Technology, "Polyurethanes," 4th Edition, John Wiley & Sons, Inc., 2011, pp. 1-63, especially pp. 30-37.
H. Strathmann et al., The Formation Mechanism of Phase Inversion Membranes, Desalination 21, 241-255 (1977).
Bee Ting Low et al. Tuning the Free Volume Cavities of Polyimide Membranes via the Contruction of Pseudo-Interpenetrating Networks for Enhanced Gas Separation Performance Macromolecules, vol. 42, No. 19, Sep. 22, 2009, pp. 7042-7045.
D. M. Amirkhanov, et al., Polymeric Membranes for Hydrogen Sulfide Separation from Natural Gas, Polymer Science, Ser. A., vol. 40, No. 2, 1998, pp. 206-212.

* cited by examiner

US 9,169,367 B2

RADIATION CURED MEMBRANES DERIVED FROM POLYMERS THAT ARE CO-REACTIVE WITH AZIDE CROSSLINKING AGENT(S)

RELATED APPLICATIONS

The present patent application claims the benefit of U.S. Provisional patent application Ser. No. 61/703,580 filed on Sep. 20, 2012, and entitled "RADIATION CURED MEMBRANES DERIVED FROM POLYMERS THAT ARE CO-REACTIVE WITH AZIDE CROSSLINKING AGENT(S)," wherein the entirety of said provisional patent application is incorporated herein for all purposes.

FIELD OF THE INVENTION

The present invention relates to membrane separation technology using membranes incorporating crosslinked oligomer(s) and/or polymer(s). More particularly, the present invention relates to membrane separation technology in which compounds comprising nitrogen-containing moieties that are multivalent (e.g., urea, urethane, amide, etc. that are at least divalent) can be reacted with azides using radiation energy to form membranes.

BACKGROUND OF THE INVENTION

Polymer membranes have been proposed for various separations. It has been found that different molecules can be made to permeate through selected polymers differently. For example if one component of a mixture is found to permeate though a polymer rapidly and a second component is found to permeate through the polymer more slowly or not at all, the polymer may be utilized to separate the two components. Polymer membranes potentially can be used for fluid separations including gas separations as well as liquid separations and/or supercritical fluid separations.

Numerous research articles and patents describe polymeric membrane materials (e.g., polyimides, polysulfones, polycarbonates, polyethers, polyamides, polyarylates, polypyrrolones, etc.) with desirable gas separation properties, particularly for use in oxygen/nitrogen separation (See, for example, Koros et al., J. Membrane Sci., 83, 1-80 (1993); and Du et al., Macromol. Rapid Commun., 32, 631-636 (2011), hereinafter referred to as the Du Article.

The polymeric membrane materials are typically used in processes in which a feed gas mixture contacts the upstream side of the membrane. This results in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

Membrane performance may be characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

The relative ability of a membrane to achieve the desired separation is referred to as the separation factor or selectivity for the given mixture. There are however several other obstacles to use of a particular polymer to achieve a particular separation under any sort of large scale or commercial conditions. One such obstacle is permeation rate. One of the components to be separated must have a sufficiently high permeation rate at the preferred conditions or else extraordinarily large membrane surface areas are required to allow separation of large amounts of material. Another problem that can occur is that at conditions where the permeability is sufficient, such as at elevated temperatures or pressures, the selectivity for the desired separation can be lost or reduced. Another problem that often occurs is that over time the permeation rate and/or selectivity is reduced to unacceptable levels.

A further problem that can occur is that one or more components of the mixture can alter the morphology of the polymer membrane over time. This can degrade the permeability and/or selectivity characteristics of the membrane. One specific way this can happen is if one or more components of the mixture causes plasticization of the polymer membrane. Plasticization occurs when one or more of the components of the mixture causes the polymer to swell. Swelling tends to result in a significant increase in permeabilities for most if not all of the components of a feed mixture. This causes degradation of membrane properties. In particular, selectivity is compromised.

It has been found that acid gases (e.g., $CO_2$) and/or hydrocarbons (such as those hydrocarbons that have a carbon content greater than that in methane) can induce plasticization in many polymers, decreasing performance of the membranes made from the polymers. This can be particularly problematic in separations in which $CO_2$ is to be separated from natural or flue gas mixtures. For example, in applications where $CO_2$ is to be separated from flue or natural gases, both high $CO_2$ fluxes through the membrane and high $CO_2$/non-polar gas selectivities are desired when membranes are used that favor $CO_2$ transport through the membrane. However, the selectivity for $CO_2$ can be lost due to plasticization.

Accordingly, there is a strong need for separation membranes with stable, long lasting membrane properties that can separate acid gases such as $CO_2$ from other gases and yet are highly resistant to $CO_2$ induced plasticization. Additionally, there is a strong need for a polymeric membrane that exhibits high selectivity for the separation of gas mixtures of over a wide temperature and pressure ranges, thereby maintaining high selectivity at different process conditions and temperatures common to an industrial gas separation process.

SUMMARY OF THE INVENTION

The present invention appreciates that compounds comprising nitrogen-containing moieties that are at least divalent (e.g., urea, urethane, amide, etc.) can be reacted with azides using at least radiation energy to initiate the reaction between at least a portion of the compounds and the azides and form membranes that have surprisingly high selectivities for acid gases relative to nonpolar gases such as hydrocarbons. The membranes also have high acid gas flux characteristics.

Advantageously, such membranes can be extremely thin (e.g., 10 micrometers or less), which promotes high permeability for the acid gas and can translate into high productivity on a scaled-up, industrial level.

Representative embodiments of the invention are radiation cured membranes that surprisingly have better selectivities for acid gases relative to nonpolar gases such as hydrocarbons than membranes derived of the same or similar ingredients, but that are only thermally cured.

In addition, membranes formed according to the present invention are more resistant to plasticization due to acid gases (e.g., $CO_2$) and/or hydrocarbons such as ethane and butane as compared to membranes derived from the same ingredients and exposed to only thermal energy to initiate reaction between the azides and compounds comprising nitrogen-containing moieties. Also, membranes formed according to the present invention are more resistant to plasticization due to acid gases (e.g., $CO_2$) and/or hydrocarbons such as ethane and butane as compared to membranes derived from the same compounds comprising nitrogen-containing moieties, but including no azides. The resultant membranes of the present invention have stable structure and stable separation properties over a wide range of temperatures, including higher temperatures and pressures such as those associated with industrial gas separation facilities. It is noted that the membranes are compatible with many industrial processes in which acid gases are separated from hydrocarbon gases or non-polar gases. In an exemplary mode of practice, the membranes can be used to separate acid gases from the hydrocarbon gases in natural or non-acid gas components of flue gas mixtures (e.g., $N_2$, $O_2$, etc.).

In one aspect, the present invention relates to a radiation cured membrane derived from ingredients comprising:
a) at least one compound comprising:
 i) a plurality of ester moieties and/or a plurality of ether moieties; and
 ii) a plurality of N-containing backbone moieties, wherein each N-containing moiety is at least divalent; and
b) at least one azide crosslinking agent that is co-reactive with the at least one compound.

In another aspect, the present invention relates to a method of making a radiation cured membrane comprising:
a) forming a composition comprising:
 i) at least one compound comprising:
  A) a plurality of ester moieties and/or a plurality of ether moieties; and
  B) a plurality of N-containing backbone moieties, wherein each N-containing moiety is at least divalent;
 ii) at least one azide crosslinking agent that is co-reactive with the at least one compound; and
b) forming at least a portion of the composition into a membrane structure; and
c) exposing the membrane structure to radiation so as to substantially cure the membrane structure and form a membrane.

In some preferred embodiments, the at least one compound comprises at least one polyurethane.

DETAILED DESCRIPTION OF PRESENTLY PREFERRED EMBODIMENTS

Figure 1:
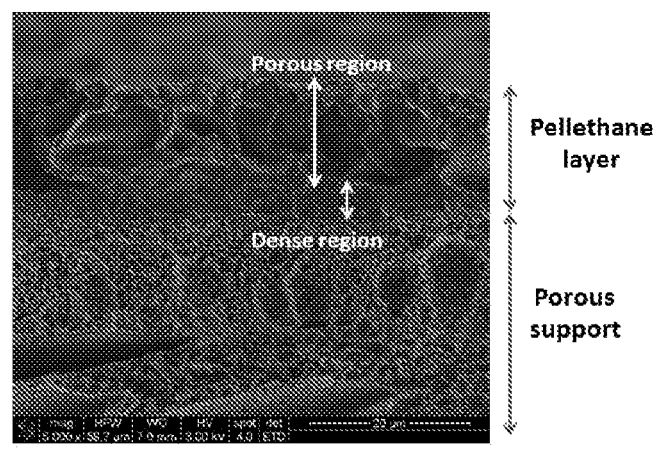
FIG. 1 shows a scanning electron micrograph (SEM) of a self-supporting membrane made from PELLETHANE® 2102-75A and an azide crosslinking agent.

The embodiments of the present invention described below are illustrative and are not intended to be exhaustive or to limit the invention to the precise forms disclosed in the following detailed description. Rather the embodiments are chosen and described so that others skilled in the art may appreciate and understand the principles and practices of the present invention.

The curable compositions of the present invention incorporate ingredients including one or more compounds (hereinafter referred to as "membrane compounds") and at least one or more azide crosslinking agents, where the one or more membrane compounds are co-reactive with the one or more azide crosslinking agents when exposed to curing conditions so as to form a membrane that can separate components of a fluid as described herein.

In some embodiments, the one or more membrane compounds include a plurality of nitrogen-containing moieties that are at least divalent. Examples of these nitrogen-containing moieties include amide, urea, and/or urethane moieties. These moieties may be backbone moieties or present in pendant groups, but preferably are backbone moieties.

The membrane compounds may be adducts, oligomers and/or polymers. As used herein, an adduct refers to a compound that is the product of two or more reactant molecules, resulting in a single reaction product containing residues of all the reactant molecules. The reactant molecules may be the same or different. An oligomer as used herein is an adduct obtained from 2 to 10 reactant molecules wherein at least one of the reactant molecules is a monomer. A polymer is an adduct obtained from more than 10 reactant molecules, wherein at least one of the reactant molecules is a monomer. Adducts may be obtained by pre-reacting a portion of the reactants to form one or more precursors, which are then assembled to form the final molecule.

Exemplary oligomer and polymer embodiments of membrane compounds include one or more poly(ester-amides), poly(ether-amides), poly(etherester-amides), polyurethanes including thermoplastic polyurethanes (e.g., poly(ester-urethanes), poly(ether-urethanes), and poly(etherester-urethanes)), poly(ester-ureas), poly(ether-ureas), poly(etherester-ureas), combinations of these, and the like. Exemplary self-assembling units in the membrane compound useful in the present invention are bis-amides, bis-urethanes and bis-urea units or their higher oligomers. The oligomers or polymers may simply be referred to herein as polymers, which includes homopolymers or homooligomers as well as interpolymers or interoligomers such as co-polymers, terpolymers, etc.

Exemplary embodiments of these kinds of oligomers and polymers and their preparations are described in U.S. Pat. No. 6,172,167; U.S. Pat. No. 7,297,394; U.S. Pat. Pub. No. 2010-0126341; U.S. Pat. Pub. No. 2008-0214743; PCT Pub. No. WO 2007/099397; PCT Pub. No. WO 2007/030791; PCT Pub. No. WO 2008/064857; PCT Pub. No. WO 2008/101051; PCT Pub. No. WO 2008/112833; PCT Pub. No. WO 2008/121579; PCT Pub. NO. WO 2012/088077; and *Encyclopedia of Polymer Science and Technology*, "Polyurethanes," Sonnenschein et al., $4^{th}$ Edition, John Wiley & Sons, Inc., 2011, pages 1-63, especially pages 30-37.

In some embodiments, preferred one or more membrane compounds comprise 1) a plurality of ester backbone moieties and/or ether backbone moieties and 2) a plurality of nitrogen-containing moieties that are at least divalent. The ester and/or ether content and nitrogen content of the membrane compounds makes them suitable for use in membrane separation. The nitrogen-containing moieties have a polar, basic character. Consequently, these moieties tend to have an affinity for acidic contaminants such as $CO_2$, COS, $H_2S$, and the like. The ester moieties and/or ether moieties generally have a strong affinity for $CO_2$. Consequently, membranes made from one or more of these compounds have a selectivity for separating acid gases, particularly $CO_2$, from nonpolar gases such $N_2$, $O_2$, methane, or other hydrocarbons. This makes these polymers very suitable for membrane purification of flue or natural gas, where it is desirable to remove acid gas contaminants from the flue or natural gas.

Without wishing to be bound by theory, it is believed that preferred embodiments of membrane compounds in the form of oligomers and/or polymers have the ability to physically self crosslink. This ability also is referred to in the art as the ability to self-assemble. Non-covalent bonding interactions include: electrostatic interactions (ion-ion, ion-dipole or dipole-dipole), coordinative metal-ligand bonding, hydrogen bonding, π-π-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K (assoc) constant describing the relative energetic interaction strength of a chemical complex or group of complexes having multiple hydrogen bonds. Such complexes give rise to the higher-ordered structures in a mass of membrane compounds.

Further description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl. etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

It is further believed that the ability of such membrane compounds to physically self-crosslink is one factor contributing to the excellent membrane properties of these materials. Upon physically crosslinking, an oligomer and/or polymer effectively forms larger associated or assembled oligomers and/or polymers through the physical intrarmolecular and intermolecular associations. Without wishing to be bound by theory, it is believed that such physical associations may not increase the molecular weight (weight average molecular weight, Mw, or number average molecular weight Mn) or chain length of the self-assembling material. It is also believed that the associations are predominantly physical so that little if any covalent bonds form. This combining or assembling occurs spontaneously upon a suitable triggering event such as drying or cooling. Examples of other triggering events could include shear-induced crystallizing, contacting a nucleating agent, and/or the like.

As a consequence of these physical crosslinking characteristics, some embodiments of membrane oligomers and/or polymers to some degree are able to exhibit mechanical properties similar to some higher molecular weight synthetic polymers upon physical crosslinking, but yet are able to exhibit viscosities comparable to very low molecular weight compounds when the materials are incorporated into fluid admixtures such as melts, solutions, dispersions, or the like. The materials, therefore, are easy to cast or otherwise form into membrane media from fluid precursors, especially when melt processing or evaporatively casting a solution into a membrane structure.

Yet, membrane compounds that merely physically crosslink show poor resistance to $CO_2$-induced plasticization. The present invention recognizes this and further chemically crosslinks the materials with an azide crosslinking agent. Because these materials can both physically crosslink and are further chemically crosslinked via use of an azide crosslinking agent, it can be appreciated that the cured compositions of the present invention are both physically and chemically crosslinked. Surprisingly, even though many embodiments of the oligomer and polymer membrane materials are flexible and mobile themselves, which are characteristics that indicate susceptibility to plasticization, the combination of the rigid azide-based crosslinked structure with the physical crosslinks yields membrane products with unexpected stability and high resistance to plasticization. It appears that the azide residues are not only rigid and stable themselves, but the azide residues also stabilize the physically crosslinked structure and its morphology as well.

The 1) ester and/or ether backbone moieties and 2) nitrogen-containing moiety content of the membrane compounds provide the membrane compounds with polar characteristics. Prior to physical and/or chemical crosslinking, the materials are quite flexible in contrast to the very rigid polymer materials used in the Du Article cited above.

Exemplary embodiments of oligomer and/or polymer membrane compounds have number average molecular weights, MWn (interchangeably referred to as Mn) of 500 grams per mole or more, preferably at least about 1000 g/mol, more preferably at least about 3000 g/mol, and even more preferably at least about 5000 g/mol. The MWn of the oligomer and/or polymer membrane compounds preferably is 100,000 g/mol or less, more preferably about 50,000 g/mol or less, yet more preferably about 30,000 g/mol or less, and even more preferably about 25,000 g/mol or less. Number average molecular weight preferably is determined by NMR spectroscopy for lower molecular weight polymer membrane compounds and size exclusion chromatography for higher molecular weight membrane compounds.

Exemplary embodiments of oligomer and/or polymer membrane compounds have one or more thermal transition temperatures that include glass transition temperature, Tg, and melting transition temperature, Tm. Tg refers to the temperature at which a polymer, or portion thereof, changes from a hard, glassy material to a rubbery, or viscous, material. Tm refers to the temperature at which Tm refers to the temperature at which the crystalline regions or domains of a polymer disorganize with crystalline regions or domains going from a regular structural order in a solid to the disorder of a liquid or rubbery state that is often characterized as amorphous.

Exemplary compounds can have one or more Tgs. For example, a block/segmented copolymer can have a different Tg associated with each different block/segment of the copolymer. Exemplary compounds can have one or more Tms. For example, a block/segmented copolymer can have a different Tm associated with each block/segment if each block/segment is crystalline. Exemplary compounds can have a Tg and/or Tm that are associated with each block/segment. In the practice of the present invention, values for thermal transition temperatures such as Tg and Tm are typically determined by differential scanning calorimetry, but other techniques known in the art such as dynamic mechanical spectroscopy and dynamic mechanical analysis may be applied. The thermal transition temperature(s) of a membrane compound may vary over a wide range and may be independently selected to enhance manufacturability and/or performance of the resulting membrane. The thermal transition temperature(s) of the membrane compound(s) will depend to a large degree upon the type of monomers constituting such compounds. In some preferred embodiments, it is desired to have at least one thermal transition temperature of a membrane compound be greater than the temperature at which the resulting membrane will be used. While not being bound by theory, it is believed that operating below a thermal transition temperature of a membrane compound provides appropriate mobility of the cured membrane compound and permits the desired fluid component (e.g., acid gas) of a feed mixture to travel through the cured membrane and provide the desired selectivity. With this in mind, one or more membrane compounds are selected in many embodiments to have at least one thermal transition temperature greater than −10° C., preferably greater than 15° C., and even more preferably greater than 50° C. Also, in some preferred embodiments, it is desired to have a membrane compound that does not have a thermal transition that is too high, otherwise undue loss in gas flux can occur. With this in mind, one or more membrane compounds are selected in many embodiments to have at least one thermal transition temperature of 100° C. or less, preferably 75° C. or less, and even more preferably 60° C. or less. In some embodiments, a membrane compound has at least two thermal transition temperatures.

The membrane compound preferably comprises molecularly self-assembling repeat units, more preferably comprising (multiple) hydrogen bonding arrays, wherein the arrays have an association constant K (assoc) preferably from $10^2$ to $10^9$ reciprocalmolarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4 to 6, and still more preferably at least 4 donor-acceptor hydrogen bonding moieties per molecularly self-assembling unit. Molecularly self-assembling units in preferred membrane compounds include bis-amide groups, and bis-urethane group repeat units and their higher oligomers.

In some embodiments, the one or more membrane compounds include one or more polyurethanes. Preferred polyurethanes include thermoplastic polyurethanes. As used herein, "thermoplastic polyurethane" or "TPU" refers to materials with urethane groups made by reaction of isocyanate containing compounds with hydroxyl containing compounds as well as materials having both urethane and urea groups. TPU elastomers are polymers that are prepared often in the presence of a catalyst from materials comprising at least one diisocyanate, at least one chain extender, and at least one diol polyol.

TPUs are generally recognized as being segmented copolymers that are comprised of hard-segments and soft-segments. The hard-segment is typically comprised primarily from the reaction of diisocyanate and chain extender while the soft-segment is typically comprised primarily from the diol polyol. In general, the hard-segment has a thermal transition that is greater than about ambient temperature (e.g. 20° C.) and that is higher than the soft-segment thermal transition while the soft-segment has at least one thermal transition, preferably Tg, that is less than ambient temperature. Depending on the composition of the TPU, its molecular weight, molecular weight of the diol polyol soft-segment, there is typically some degree of phase-separation that gives rise to the aforementioned thermal transitions associated with the hard-segment and the soft-segment, but TPUs may also optionally have some degree of dispersion of the hard-segment in the soft-segment which may be advantageous. In addition to these considerations of the aforementioned sentence and their impact on the morphology of the TPU (including the size and shape of the hard-segment, soft-segment, and dispersed hard-segment/soft-segment regions or domains) how the TPU membrane component is processed either from the melt state, from solution state, or a swollen state and how TPU component and azide component are solidified from processing can impact the organization or morphology of the TPU which may relate to membrane performance. It is theorized that crosslinking of the TPU by the azide via radiation curing, rather than only thermal curing or instead of thermal curing, will lead to a membrane having organization or morphology, which is process dependent, that is more readily retained under the operating conditions of the acid gas separation membrane of this invention.

The TPU component comprising diisocyanates may be aliphatic, cycloaliphatic, and aromatic including combinations thereof. Representative examples of these diisocyanates can be found in U.S. Pat. Nos. 4,385,133, 4,522,975, and 5,167,899. Preferred diisocyanates include, but are not limited to, are 4,4'-diisocyanatodiphenylmethane (4,4'-MDI), isomers and mixtures of diisocyanatodiphenylmethane, p-phenylene diisocyanate, 1,3-bis(isocyanatomethyl)cyclohexane and its isomers, 1,4-diisocyanatocyclohexane and its isomers, hexamethylene diisocyanate, isophorone diisocyanate, 4,4'-diisocyanatodicyclohexylmethane and its isomers, 2,4-toluene diisocyanate, and 2,6-toluene diisocyanate. More preferred diisocyanates include 4,4'-diisocyanatodiphenylmethane (4,4'-MDI), p-phenylene diisocyanate, 1,3-bis(isocyanatomethyl)cyclohexane and its isomers, hexamethylene diisocyanate, isophorone diisocyanate, and 4,4'-diisocyanatodicyclohexylmethane. Most preferred diisocyanates include 4,4'-diisocyanatodiphenylmethane, p-phenylene diisocyanate, and 4,4'-diisocyanatodicyclohexylmethane.

The TPU component comprising chain extender may be an aliphatic, aromatic, or non-aromatic as well as being cyclic and noncyclic and have two functional groups that can react with the diisocyanate. Chain extenders preferably have a molecular weight ranging from about about 60 to about 400 and most preferably have a molecular weight ranging from about 85 to about 250. Preferred chain extenders include diamines or diols, including their mixtures, with diol chain extenders most preferred. Preferred examples of chain extenders include, but are not limited to, ethylene glycol, diethylene glycol, 1,3-propanediol, dipropylene glycol, tripropylene glycol, 1,4-butanediol, 1,6-hexanediol, isomers of cyclohexanedimethanol and their mixtures, ethoxylated bisphenols, resorcinol bis(2-hydroxyethylether), hydroquinone bis(2-hydroxyethylether), ethylene diamine, 2-methyl-1,5-pentanediamine, 1,6-hexanediamine, isophorone diamine, piperazine, aminoethylpiperazine, isomers of methylene bis(aniline), and diethyltoluenediamine. More preferred examples of chain extenders include ethylene glycol, 1,3-propanediol, 1,4-butanediol, 1,6-hexanediol, isomers of cyclohexanedimethanol and their mixtures, and mixtures thereof. At least one most preferred chain extender includes 1,4-butanediol.

The TPU component comprising the diol polyol are of low to moderate number average molecular weight ranging from about 600 to about 10000, preferably about 800 to about 7500, more preferably from about 1000 to about 4000, and most preferably from about 1400 to about 2400. Diol polyols may be homopolymers, random copolymers, block copolymers, segmented copolymers as well as capped products that may contain initiator residues. A variety of chemical structures may make up a diol polyol with the primary requirements being the presence of two alcohol groups (i.e. diol) and that the diol polyol have at least one thermal transition below either ambient temperature (i.e. 20° C.) and/or the operating temperature of the membrane of this invention. Preferred general classes of diol polyol structural types that are generally aliphatic or cycloaliphatic include polyester polyols, polyether polyols, polycarbonate polyols, polyalkylene polyols, polybutadiene polyols including their hydrogenated products, and polysiloxane polyols including their mixtures. More preferred diol polyols are polyester polyols and polyether polyols. Polyester polyols are generally prepared by either the ring opening polymerization/oligomerization of a cyclic ester, with some also known as a lactones, or by a polycondensation of an aliphatic or cycloaliphatic glycol (i.e. a compound with two diols with molecular weight up to about 300) with either an aliphatic diester or diacid or diacid dihalide such that the polyester polyol has two alcohol endgroups. Preferred examples of diol polyester polyols include, but are not limited to, polycaprolactone polyol, polypropiolactone polyol, polyglycolide polyol, polypivolylactone polyol, polyvalerolactone polyol, polyethylene adipate polyol, polypropylene adipate polyol, polybutylene adipate polyol, polyhexamethylene adipate polyol, polyneopentyl adipate polyol, polycyclohexanedimethylene adipate polyol, polyethylene succinate polyol, polypropylene succinate polyol, polybutylene succinate polyol, polyhexamethylene succinate polyol, polyneopentyl succinate polyol, polycyclohexanedimethyl succinate polyol, polyethylene azelate polyol, polypropylene azelate polyol, polybutylene azelate polyol, polyhexamethylene azelate polyol, polyneopentyl azelate polyol, polycyclohexanedimethylene azelate polyol, polyethylene sebacate polyol, polypropylene sebacate polyol, polybutylene sebacate polyol, polyhexamethylene sebacate polyol, polyneopentyl sebacate polyol, polycyclohexanedimethylene sebacate polyol, and their copolyester polyols. More preferred examples of diol polyester polyols include polycaprolactone polyol, polyethylene adipate polyol, polypropylene adipate polyol, polybutylene adipate polyol, polyhexamethylene adipate polyol, polycyclohexanedimethylene adipate polyol, polyethylene succinate polyol, and polybutylene succinate polyol. Most preferred examples of diol polyester polyols include polycaprolactone polyol, polyethylene adipate polyol, polypropylene adipate polyol, and polybutylene adipate polyol. Polyether polyols are generally prepared by the ring opening polymerization/oligomerization of cyclic ethers such as ethylene oxide, propylene oxide, butylene oxide, hexylene oxide, oxetane, tetrahydrofuran, 1,3-dioxalane, and the like. Preferred examples of diol polyether polyols include, but are not limited to, polyethylene glycol, polypropylene glycol, polybutylene glycol, polyhexylene glycol, polytrimethylene glycol, poly(ethylene glycol-co-propylene glycol), polypropylene glycol capped with ethylene oxide, poly(ethylene glycol)-block-poly(propylene glycol)-block-(polyethylene glycol), and polytetramethylene glycol. More preferred examples of diol polyether polyols include polyethylene glycol, polypropylene glycol, poly(ethylene glycol-co-propylene glycol), polypropylene glycol capped with ethylene oxide, poly(ethylene glycol)-block-poly(propylene glycol)-block-(polyethylene glycol), and polytetramethylene glycol. Most preferred examples of diol polyether polyols include polyethylene glycol, poly(ethylene glycol-co-propylene glycol), and polytetramethylene glycol.

In some embodiments, preferred TPUs include poly(ester-urethanes), poly(ether-urethanes), and poly(etherester-urethanes)). For TPUs, when the term poly(ester-urethane) is used, ester refers to the soft-segment that is a polyester polyol. For TPUs, when the term poly(ether-urethane) is used, ether refers to a soft-segment that is a polyether polyol. For TPUs, when the term poly(etherester-urethane) is used, etherester refers to a either a soft-segment that is a polyetherester polyol or comprises a mixture of polyether polyol and polyester polyol.

Thermoplastic polyurethanes (also referred to as one class of thermoplastic elastomers) and methods of making them are well-known. See, e.g., U.S. Pat. No. 7,297,394; PCT Pub. No. WO 2008/064857; PCT Pub. No. WO 2008/121579; and *Encyclopedia of Polymer Science and Technology*, "Polyurethanes," Sonnenschein et al., 4$^{th}$ Edition, John Wiley & Sons, Inc., 2011, pages 1-63, especially pages 30-37.

Thermoplastic polyurethanes can be commercially obtained, e.g., under the tradename PELLETHANE® and ESTANE® thermoplastic polyurethane from the Lubrizol® Corporation, Wickliffe, Ohio, and ELASTOLLAN® thermoplastic polyurethane from BASF®. A preferred thermoplastic urethane includes PELLETHANE® 2102-75A, which is a polyurethane based on polycaprolactone polyol.

In some embodiments, a membrane compound may include one or more "non-aromatic hydrocarbyl, hydrocarbylene, heterohydrocarbylene, and/or heterohydrocarbyl groups. The term "nonaromatic" refers to groups not having or including any backbone or pendant aromatic structures such as aromatic rings (e.g. arylene or aryal such as substituted or non-substituted phenyl or phenylene), fused aromatic ring structures, and the like. The non-aromatic heterohydrocarbylene and heterocarbyl groups generally include at least one non-carbon atom (e.g. N, O, S, P or other heteroatom) in the backbone of the polymer or oligomer chain. These groups may be linear, branched, cyclic, polycyclic, fused cyclic, and combinations of these. Optionally, non-aromatic hydrocarbyl, hydrocarbylene groups, and/or non-aromatic groups may be substituted with various substituents or functional groups, including but not limited to one or more halides, alkoxy groups, hydroxy groups, thiol groups, ester groups, ketone groups, carboxylic acid groups or salts thereof, sulfate, sulfonate, phosphate, phosphonate, $NO_3$, $NO_2$, ammonium, amines, amides, combinations of these, and the like. In some embodiments, a membrane compound includes less than 5 weight percent, more preferably less than 1 weight percent, and more preferably no aromatic moieties based on the total weight of the compound.

In one set of embodiments, the oligomer and/or polymer membrane compounds comprise ester repeat units of Formula I:

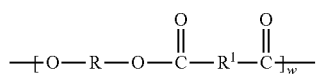

Formula I and at least one second repeat unit selected from the ester amide units of Formula II, and/or the ester amide units of Formula III:

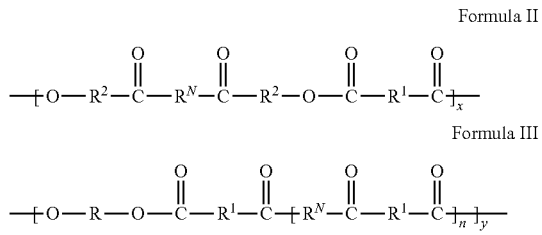

Formula II

Formula III wherein:

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene-(including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including hetereoalkylene, heteroalkylene-cycloalkylene, cycloalkylene-heteroalkylene, or heteroalkylene-cycloalkylene-heteroalkylene, each aforementioned group preferably comprising from 2 to 12 carbon atoms, more preferably from 3 to 7 carbon atoms. Preferred heteroalkylene groups include oxydialkylenes, for example diethylene glycol (—$CH_2CH_2OCH_2CH_2$—O—). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is —$(CH_2)_4$—.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably —$(CH_2)_4$—.

$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is —$(CH_2)_2$—, —$(CH_2)_3$—, —$(CH_2)_4$—, or —$(CH_2)_5$—.

$R^N$ is at each occurrence —$N(R^3)$—Ra—$N(R^3)$—, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms; w represents the ester mol fraction, and x and y represent the amide mole fractions where w+x+y=1, 0<w<1, and at least one of x, and y is greater than 0. Ra is a $C_2$-$C_{20}$ non-aromatic hydrocarbylene group, more preferably a $C_2$-$C_{12}$ alkylene: most preferred Ra groups are ethylene, butylene, and hexylene —$(CH_2)_6$—. In some embodiments, $R^N$ is piperazin-1,4-diyl. According to another embodiment, both $R^3$ groups are hydrogen.

n is at least 1 and has a mean value less than 2.

In other alternative embodiments, the oligomer and/or polymer membrane compounds comprise repeat units of Formula II and Formula III, wherein R, $R^1$, $R^2$, $R^N$, and n are as defined above and x and y are mole fractions wherein x+y=1, and 0≤x≤1 and 0≤y≤1.

In certain polyesteramide embodiments comprising Formula I and II units, or Formula I, II, and III units, particularly preferred materials are those wherein R is —$(C_2$-$C_6)$-alkylene, especially —$(CH_2)_4$—. Also preferred are materials wherein $R^1$ at each occurrence is the same and is $C_1$-$C_6$ alkylene, especially —$(CH_2)_4$—. Further preferred are materials wherein $R^2$ at each occurrence is the same and is —$(C_1$-$C_6)$-alkylene, especially —$(CH_2)_5$-alkylene.

For convenience the chemical repeat units for various embodiments are shown independently. The invention encompasses all possible distributions of the w, x, and y units in the copolymers, including randomly distributed w, x, and y units, alternatingly distributed w, x, and y units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, and/or y unit. In some embodiments, the mole fraction of w to (x+y) units is between about 0.1:0.9 and about 0.9:0.1. In some preferred embodiments, the copolymer comprises at least 15 mole percent w units, at least 25 mole percent w units, or at least 50 mole percent w units.

A specific example of a suitable membrane compound comprises units according to Formula V and Formula VI:

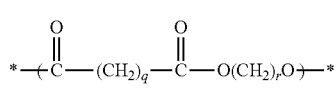

Formula V

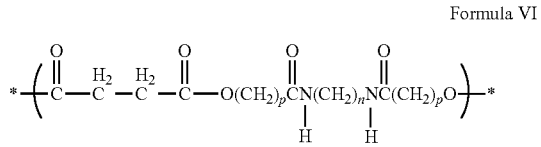

Formula VI wherein q and r are 4, n is 2, p is 5, x is 0.18, and y is 0.82. According to another specific example, a suitable membrane compound comprises units according to Formula V and VI, wherein q and r are 4, n is 2, p is 5, x is 0.5, and y is 0.5.

Preferably, polydispersities of substantially soluble or gel-free membrane compounds useful in the present invention is 4 or less, more preferably 3 or less, still more preferably 2.5 or less, still more preferably 2.2 or less.

In many embodiments, a membrane made according to the present invention is derived from a curable composition that includes at least 80 weight percent, desirably at least 90 weight percent, more desirably at least 95 weight percent of the total amount of membrane compounds(s) based on the total weight of the curable composition. Further, in many embodiments, a membrane made according to the present invention is derived from a curable composition that includes no more than 98 weight percent, desirably no more than 99 weight percent, more desirably no more than 99.98 weight percent of the total amount of membrane compounds(s) based on the total weight of the curable composition.

Curable compositions of the present invention involve a combination of one or more membrane compounds and one or more azide crosslinking agents. An azide crosslinking agent refers to a compound comprising two or more azide moieties. An azide moiety is an anion with the formula —$N_3^-$. Exemplary embodiments of azide crosslinking agents include from 2 to 6 azide moieties, preferably 2 azide moieties. Advantageously, azide crosslinking agents when used in combination with the physically crosslinking membranes described above help to form a membrane structure that resists plasticization so that resultant membranes have long lasting, stable separation properties including better retention of separation properties than without azide crosslinking agents.

Exemplary azide crosslinking agents may be represented by the following formula

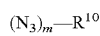

wherein m is 1 to 6, preferably 2, and $R^{10}$ is an m-valent moiety that may be aryl or nonaryl: saturated or unsaturated; linear or branched or cyclic; and/or substituted or unsubstituted. In some embodiments, $R^{10}$ is aryl and comprises at least one, preferably at least 2 aromatic ring moieties. Some or all of the aromatic ring moieties may be fused and/or linked by suitable linking groups.

Exemplary aryl embodiments of azide crosslinking agents may be represented by the following formula

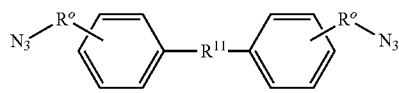

wherein each $R^o$ and $R^{11}$ independently is a divalent linking group that may comprise a heteroatom such as one or more of O, S, P, or the like and that may be linear, branched, cyclic, polycyclic, fused ring, or the like; with the proviso that each $R^o$ independently may be a single bond. Each $R^o$ and $R^{11}$ may be saturated or unsaturated. Each $R^o$ and $R^{11}$ independently may be substituted or unsubstituted. If present, exemplary substituents may include one or more halides, alkoxy groups, hydroxy groups, thiol groups, ester groups, ketone groups, carboxylic acid groups or salts thereof, sulfate, sulfonate, phosphate, phosphonate, $NO_3$, $NO_2$, ammonium, amines, urethane, urea, amides, combinations of these, and the like. If any $R^o$ or $R^{11}$ has a backbone or pendant moieties include 1 or more C atoms, the backbone or such moieties independently may include one or more heteroatoms. Optionally, the aromatic ring structures may be further substituted or unsubstituted with substituents such as the exemplary substituents described herein. For purposes of illustration, other than the pendant —$R^o$—$N_3$ moieties and the $R^{11}$ linking group, the aromatic ring structures are unsubstituted.

A preferred azide crosslinking agent according to this formula has the structure (hereinafter referred to as bisazide A):

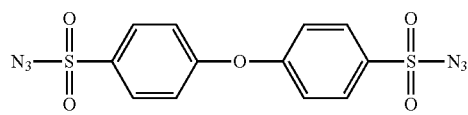

Another azide crosslinking agent according to this formula has the following structure:

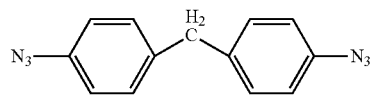

In some modes of practice, $R^{11}$ is a linear, branched, cyclic, or polycyclic hydrocarbyl moiety of the formula

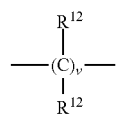

wherein v is 1 to 10, preferably 1 to 6, more preferably 1 to 4; each R12 independently is H, alkyl of 1 to 10 carbon atoms, alkoxy of 1 to 10 carbon atoms. Optionally, each R12 independently may be substituted with one or more substituents such as the exemplary substituents listed above. Specific hydrocarbyl embodiments of $R^{11}$ include —$CH_2$—, —$CH_2CH_2$—, —$CH_2CH_2CH_2$—; —$CH_2CH(CH_3)$—; —$CH_2CH(CH_3)CH_2$—; —$CH_2CH_2CH_2CH_2$—; combinations of these, and the like.

In other modes of practice, each of $R^o$ and $R^{11}$ independently is a linear, branched, cyclic, or polycyclic alkoxylene moiety of the formula

wherein q is 1 to 10, preferably 1 to 6, more preferably 1 to 4; and $R^{13}$ is a divalent alkylene moiety that may be linear, branched, cyclic, or polycyclic. Optionally, each $R^{13}$ independently may be substituted with one or more substituents such as the exemplary substituents listed above. Specific alkoxylene embodiments of $R^{11}$ include —$OCH_2$—, —$OCH_2CH_2$—, —$OCH_2CH_2CH_2$—; —$OCH_2CH(CH_3)$—; —$OCH_2CH(CH_3)CH_2$—; —$OCH_2CH_2CH_2CH_2$—; combinations of these, and the like.

Other examples of the divalent moieties $R^o$ and R11 include oxygen as well as

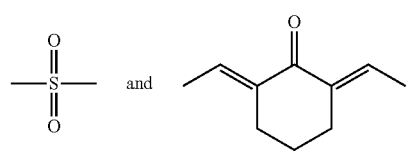

Other aryl embodiments of $R^{10}$ may have fused ring structures such as

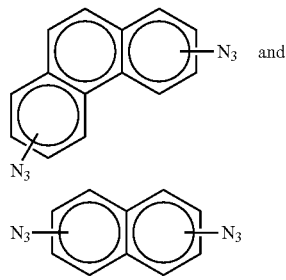

The fused ring structures are shown for purposes of illustration as being unsubstituted except for the azide groups. Optionally other pendant substituents such as one or more of the exemplary substituents listed herein may be present.

Nonaryl embodiments of azide crosslinking agents include a variety of compounds including compounds such as $N_3$—$(R^{13}O)_q$—$R^o$—$N_3$, wherein $R^{13}$, q, and $R^o$ are independently as defined above. In some embodiments, azide crosslinking agents can have a poly(ethylene oxide) repeat group between two azide groups. A generic structure of these materials is shown in the formula

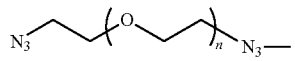

where n is an integer from 1 to 100, although in mixtures n can be reported as a non-integer.

Azide crosslinking agents and methods of making them are well known. Exemplary azide crosslinking agents are commercially available from, e.g., SIGMA-ALDRICH®.

Without wishing to be bound, it is believed that an azide group leads to crosslinking initially by releasing $N_2$, leaving a highly reactive nitrene moiety. This moiety can then displace H from a C—H bond in the polymer backbone. Then, the nitrene forms a covalent bond with the carbon atom. It is believed that any C—H bond could be a viable site for this crosslinking. It is possible that the carbon atoms in an alpha position proximal to a carbonyl moiety may form relatively stable radicals and may be preferred sites for this crosslinking.

The total amount of azide crosslinking agent(s) used to crosslink the membrane compounds and thereby form dimensionally stable, plasticization-resistant membrane structures can vary over a wide range. Generally, if too little of the crosslinking material is used, the cured material may not be as resistant to plasticization as desired and/or may not provide selectivity (i.e., a selectivity of 1 as determined by EQ-a below) of one or more acid gases relative to hydrocarbon gases. Further the amount of azide crosslinking agent(s) may be dependent on the selection of membrane compound(s) in combination with the azide crosslinking agent(s). On the other hand, if too much is used, then chain-scission or film cracking can occur. Balancing these concerns, azide crosslinking desirably is accomplished in many embodiments by using at least 0.02 weight percent, more desirably at least 0.05 weight percent of the total amount of azide crosslinking agent(s) based on the total amount of the curable composition. Further, azide crosslinking desirably is accomplished in many embodiments by no more than 15 weight percent, desirably no more than 10 weight percent, more desirably no more than 5 weight percent of the total amount of azide crosslinking agent(s) based on the total amount of the curable composition. In some embodiments, there is a non-linear relationship with respect to amount of azide crosslinking agent and selectivity of the cured membrane. For example, the selectivity can increase to a maximum as the amount of azide crosslinking agent increases, but then selectivity decreases as more azide crosslinking agent is included.

In addition to the membrane compound(s) and the azide crosslinking agent(s), curable compositions of the present invention optionally may include one or more other ingredients. In some embodiments, the optional other ingredients including and without limitation thereto, oils, antioxidants, fungicides, bactericides, antistatic agents, combinations of these, and the like.

The curable compositions of the present invention have a wide range of uses. In particular, the compositions can be used to fabricate separation membranes that are especially useful in the purification, separation or adsorption of a particular species in fluid phase such as a liquid phase, gas phase, a super-critical phase, and combinations thereof. In addition to separation of fluids such as gases, these membranes may be used for the separation of proteins or other pharmaceutical and biotechnology materials. The membranes may also be used in fermenters and bioreactors to transport gases into the reaction vessel and transfer cell culture medium out of the vessel. Additionally, the membranes may be used for ethanol production in a continuous fermentation/membrane pervaporation system, and in detection or removal of trace compounds or metal salts in air or water streams.

The membranes are especially useful in gas/vapor separation processes in chemical, petrochemical, pharmaceutical and allied industries for removing acid gases from mixed gas streams. In preferred modes of practice, the membranes may be used to remove acid gases (e.g., $CO_2$, COS, $H_2S$, volatile mercaptans and the like) from hydrocarbons (e.g., methane, ethane, and propane) in streams of natural gases or flue gases in that the membranes have high acid gas permeability, low nonpolar gas permeability, and resistance to plasticization. Further, the membrane characters are stable and uniform over time.

For instance, the membranes would allow carbon dioxide to diffuse through the membrane at a faster rate than the nonpolar gases (such as methane, ethane, propane, or butane, or other gases such as nitrogen, oxygen, or the like) that may be present in a natural gas. Carbon dioxide has higher permeation rate than methane because of higher solubility, higher diffusivity, or both. Thus, carbon dioxide enriches on the permeate side of the membrane, and methane enriches on the feed side of the membrane.

Examples of a flue gas are combustion gases produced by burning coal, oil, natural gas, wood, hydrogen gas, or a combination thereof. A natural gas can be naturally-occurring (i.e., found in nature) and/or manufactured. Examples of a manufactured methane gas-containing gas mixture are methane produced as a by-product from a crude oil cracking operation and biogas, which can be produced in landfills or sewage facilities from catabolism of garbage and biological waste by microorganisms. In some embodiments the unit operation is employed downstream from a furnace or other combustion apparatus for separating acid gas from flue gas or downstream from an oil or natural gas well-head for separating acid gas from natural gas.

In an exemplary separation method, a membrane of the present invention having an inlet surface and an outlet surface is provided. Additionally, a feed gas mixture comprising at least one acid gas and at least one nonpolar gas is provided. The feed gas mixture is caused to contact the inlet surface of the membrane under conditions such that at least a portion of the acid gas permeates through the membrane at a faster rate than the at least one nonpolar gas. Exemplary conditions include causing the contact to occur while a suitable pressure differential exists between the inlet and outlet faces of the membrane. A result is that, compared to the feed gas mixture, the separation yields a first separation product proximal to the outlet face of the membrane that is enriched with respect to an acid gas. In the meantime, a second separation product with a depleted acid gas content relative to the feed gas mixture is produced proximal to the inlet face of the membrane.

The membranes may take any form of any membrane structure known in the art, for example hollow fibers, tubular shapes, flat sheets, spiral wound, pleated, and other membrane shapes including membranes placed on a porous support that may be of any material. The compounds are particularly useful for making thin film membranes that have high selectivity for acid gases relative to nonpolar gases. A thin film selective membrane refers to a selective membrane having a thickness on the order of 10 microns or less, preferably 2 microns or less, more preferably 1 micron or less. In many embodiments, such thin film membranes have a thickness of at least 20 nm, preferably at least 50 nm, more preferably at least 100 nm. In those embodiments in which a membrane is formed from a stack of two or more selective sublayers, these thickness features refer to the total thickness of all the layers. The thickness taught herein does not include the thickness contributed by non-selective supporting layers or other non-membrane components that may be present.

Selectivity of a membrane with respect to a mixed gas, $\alpha_{A/B}$ can be determined according to equation (EQ-a):

$$\alpha_{A/B} = \frac{x_{A}/y_{A}}{x_{B}/y_{B}} \tag{EQ-a}$$

where $x_A$ and $x_B$ are the molar concentrations of component A and B in the permeant gas; $y_A$ and $y_B$ are the molar concentrations of component A and B in the mixed gas stream (feed), respectively. For example, component A can be $CO_2$ gas and component B can be $CH_4$ gas. As used herein, a "selective" layer or membrane means a membrane having an acid gas/hydrocarbon selectivity of greater than 3, preferably at least 5, even more preferably at least 7. Further, in some embodiments, a selective layer can have a selectively of 750 or less, 500 or less, 250 or less, 100 or less, or even 80 or less. In some embodiments, a preferred membrane has a selectivity of greater than 3, preferably at least 5, even more preferably at least 7, where component A in EQ-a is $CO_2$ and component B is methane, ethane, and/or propane. As used herein, a "non-selective" layer or other non-membrane components has a selectivity of 3 or less.

In some embodiments, a membrane can be "self-supporting" meaning that at least a portion of a selective layer can be used to form a "non-selective" layer. For example, after forming a selective layer, a phase inversion process (discussed below) can be used to cause a portion of the selective layer to increase in thickness and porosity such that the selectivity of the portion decreases until it becomes non-selective, yet the non-selective portion can function to provide mechanical support for the selective portion (i.e., the membrane portion). In many embodiments, the selective portion has thickness as discussed above with respect to a selective layer or membrane. In many embodiments, the non-selective portion has a thickness of at least 10 nanometers, preferably at least 100 nanometers, and more preferably at least 1 micron. An example of self-supporting membrane is shown in FIG. 1, which is described below with respect to a phase inversion process.

The membranes of the present invention are functional over a wide range of temperatures and pressure differentials. For example, the membranes may be used to treat feed material provided at one or more temperatures in the range from −50° C. to 200° C., preferably −30° C. to 100° C., more preferably −20° C. to 90° C., and even more preferably −10° C. to 70° C. Further, the pressure differential between the upstream and downstream sides of the membrane may be in the range from 90 kPa to 10,000 kPa, preferably 200 kPa to 3000 kPa. Advantageously, the membranes display stable selectivity, and permeability characteristics at high temperatures and/or pressures, whereas prior membrane embodiments might have been more susceptible to plasticization or other degradation at such higher temperatures and pressures.

The curable compositions can be formed into membrane structures in a variety of ways. According to one approach, a fluid admixture incorporating the ingredients of the curable composition is provided. This can be a melt, solution, dispersion, or the like. The fluid composition is then cast, extruded, calendared, sprayed, coated, molded, or otherwise used to form the desired membrane structure which may include a phase-inversion or coagulation type of process which may advantageously influence and control the morphology.

A variety of solvents can be used to form a solution of the membrane compounds. Such solvents are well-known and include, but are not limited to, for example, halogenated solvents such as chloroform, polar aprotic solvents such as dimethylsulfoxide, N,N-dimethylformamide, N,N-dimethyacetamide, N-methylpyrrolidinone, ether solvents such as tetrahydrofuran, glyme, 1,4-dioxane, and pyridine and the like.

The curable compositions are at least partially cured by irradiation while the curable compositions are being formed into the desired membrane structure and/or after the curable compositions have been formed into the desired membrane structure. For example, if a membrane structure is formed using a solvent, the membrane structure can be radiation cured before removing any solvent or after at least a portion of the solvent is removed (even after the curable composition is completely dried). Curing the curable compositions at least by radiation can provide membranes with enhanced selectivity as compared to an uncured material having the same membrane compounds.

Without being bound by theory, it is believed that curing at least partially by irradiation provides enhanced selectivity because radiation curing can "lock-in" the morphology of the membrane compounds that is present when irradiation curing occurs. If the curable compositions are cured only by thermal curing, the curable compositions may be heated from a temperature below a thermal transition temperature such as Tg or Tm to a temperature above the thermal transition of a membrane compound such that the morphology of the membrane compound changes to an undue degree and results in decreased selectivity as compared to the selectivity provided by the morphology of the membrane compound below said thermal transition temperature. In an exemplary mode of curing, a curable composition may be cast into a membrane structure at about room temperature (e.g., about 20-25° C.) and then cured by irradiation while the membrane structure is at about room temperature. Also, while not being bound by theory, it is believed that irradiation curing can initiate reaction between the azide crosslinking agents and membrane compounds more uniformly throughout the curable composition for a given exposure time and, therefore, provide better selectivity. In contrast, thermal curing alone may be limited by non-uniformity of heat transfer such that initiation of reaction between the azide crosslinking agents and membrane compounds may be less uniform throughout the curable composition for a given exposure time and, therefore, may provide lower selectivity.

As used herein, "irradiation curing" means exposing a curable composition to ultraviolet (UV) and/or electron beam (EB) electromagnetic radiation so as to initiate reaction between the azide crosslinking agent and membrane compound (e.g., polyurethane). Ultraviolet radiation includes wavelengths from 10 to 400 nanometers. Irradiation curing does not include thermal curing. As used herein, "radiation cured" means cured by irradiation curing.

It is desirable that irradition is uniform and of a sufficient duration to accomplish initiation of reaction between the azide crosslinking agents and membrane compounds. However, the duration should be limited so as to avoid material degradation. In many embodiments, the curable compositions may be exposed to irradiation for 5 or more seconds, preferably from 20 or more seconds. Further, sufficient initiation of reaction between the azide crosslinking agents and membrane compounds by exposure to irradiation is accomplished in many embodiments by exposure to irradiation for 5 or less minutes, preferably for 120 or less seconds.

Optionally, the curable compositions can be heated to any temperature so that the curable compositions can be radiation cured at the given temperature. For example, the curable compositions may be heated so as to help remove any solvent that may be present from film casting a solution, and then radiation cured at the elevated temperature. As another example, the curable compositions may be formed into a fluid membrane structure at room temperature, but heating the curable compositions to a temperature above room temperature may provide a different, more desirable morphology. In such case, radiation curing at a temperature above room temperature may provide better selectivity. In some preferred embodiments, a membrane compound in the curable composition may have one thermal transition temperature (e.g., Tg) below room temperature and a second thermal transition temperature above room temperatures. In such embodiments, the curable composition is preferably not heated to a temperature above the second thermal transition temperature before the curable composition is exposed to radiation energy for a time period that provides desired selectivity in the resulting membrane. By way of example where a curable composition is cast into a membrane structure at room temperature of about 20-25° C., a membrane compound of the curable composition may have one thermal transition temperature of 10° C., a second thermal transition temperature of 60° C., and third thermal transition temperature of 100° C. In such a case, if the curable composition is heated prior to exposing the curable composition to radiation energy, the curable composition is preferably not heated above the second thermal transition temperature of 60° C. at least until the curable composition has been exposed to radiation energy for a time sufficient to initiate reaction between at least a portion of the azides and membrane compounds so as to provide a membrane having desired selectivity. It is noted that at least partial, incidental thermal curing may occur during optional heating so long as the morphology of the membrane compound morphology is not changed to an undue degree. In other embodiments, a curable composition may be exposed to radiation energy while the curable composition is at a temperature above all thermal transition temperature(s) of the curable composition or below all thermal transition temperature(s) of the curable composition.

Optionally, the curable compositions may be at least partially thermally cured in addition to at least partially irradiation cured. Suitable thermal energy can be used to initiate azide crosslinking. If thermal curing is performed, it is desirable that heating is uniform and of a sufficient duration to accomplish azide crosslinking. However, the duration and temperature should be limited to avoid changing the membrane compound morphology to an undue degree, avoid cracking, and/or otherwise degrading the ingredients or the resultant product. In one exemplary mode of using optional thermal curing, the curable composition may be exposed to radiation for a time to at least partially cure and "lock in" a desired morphology of the membrane compounds. If there is any additional curing that can occur, a "final" cure may occur using thermal energy and/or irradiation curing if desired.

Optionally, a "phase-inversion" process as described herein may be performed on the membrane structures before, during, or after curing. Preferably, a phase-inversion process can form a "self-supporting" membrane structure. As used herein, a "self-supporting" membrane refers to a membrane that can be made into a final membrane product (e.g., hollow fibers) without the need for additional structure support.

An example of a self-supporting structure according to the present invention is shown below in FIG. 1. FIG. 1 is a scanning electron micrograph (SEM) of a self-supporting membrane made from PELLETHANE® 2102-75A and an azide crosslinking agent. The self-supporting membrane is referred to below as the "PELLETHANE® layer" and includes a dense region (i.e., the selective region according to the present invention) and a porous region that is non-selective (i.e., has a selectivity of 1 or less of acid gas relative to hydrocarbons) and functions as mechanical support for the dense region. The layer referred to below is as "porous support" was used to form the "PELLETHANE® layer" and can be separated from the "PELLETHANE® layer" such that the "PELLETHANE® layer" can be made into a final membrane product with the need for additional structure support.

In some embodiments, phase-inversion involves contacting the dissolved curable composition with a "non-solvent." As used herein, a "non-solvent" refers to a liquid that causes at least a portion of the dissolved curable composition to precipitate or coagulate out of the curable composition. As a result, the portion that precipitates or coagulates becomes a more porous and less dense layer (i.e., a "non-selective" portion or layer that has a selectivity of 1 or less of acid gas relative to hydrocarbons). Advantageously, the non-selective layer can function as mechanical support for the remaining membrane structure (i.e., the "selective portion" according to the present invention). In exemplary embodiments, the non-selective portion has a thickness of at least 50 nm, preferably at least 100 nm.

Phase-inversion as described herein is a well-known process. See, e.g., U.S. Pat. No. 2008/0143014 and H. Strathmann et al., *The Formation Mechanism of Phase Inversion Membranes*, 21 Desalination, 241, 255 (1976).

As used herein in the context of phase inversion, selection of a non-solvent is well known and is based on factors such as temperature of the non-solvent and the dissolved membrane structure, the membrane compound(s), the molecular weight of the membrane compound(s), and the like. In some embodiments, a non-solvent refers to a liquid component that the membrane compound(s) have a solubility of 0.5 wt. % or less in, preferably a solubility of 1.0 wt. % or less.

A non-solvent component can include and is not limited to one or more liquids such as water; alcohols such as methanol, ethanol, and propanol; ketones such as acetone and methylethylketone; esters such as ethyl acetate; hydrocarbons such as toluene, isooctane, and hexane. It may be desirable for the solvent for the membrane compound to be soluble in the non-solvent for the membrane compound.

In an exemplary mode of practice for forming a thin membrane structure, a curable composition of the present invention in the form of a solution is cast onto a polymer support. The casting may occur under the ambient atmosphere or may be practiced in a protected, inert atmosphere, e.g., under a blanket of argon, nitrogen, or the like. After casting the membrane structure the membrane structure is contacted with a non-solvent in a manner so that at least a portion of the curable composition (membrane compounds and azide crosslinking agent) precipitates or coagulates out of solution. After contacting the membrane structure with a non-solvent, most if not all solvent and non-solvent are removed from the membrane structure. After removing the solvent and non-solvent from the membrane structure, the cast material desirably is exposed to radiation for a time period in the range from 10 seconds to about 72 hours, preferably 1 minute to about 10 minutes. The resultant membrane structure is believed to incorporate both physical and chemical crosslinks.

Optionally, the polymer support mentioned above is in contact with a heated metal plate. The plate helps to ensure even heating of the film. The heated metal plate is heated to a curing temperature, which in many embodiments may be at a curing temperature in the range from 20° C. to 160° C., preferably 100° C. to 140° C. The cast material desirably is heated on the metal plate for a time period in the range from 20 seconds to about 72 hours, preferably 1 minute to about 10 minutes. After heating, the film is cooled.

The present invention will now be further described with respect to the following illustrative examples.

Example 1

Making C2C50% Polymer Useful as a Membrane Compound in the Practice of the Present Invention Step (a) Preparation of the diamide diol, ethylene-N,N'-dihydroxyhexanamide (C2C) monomer:

A diamide diol monomer (referred to as the C2C diamide diol monomer or the C2C monomer) is prepared by reacting 1.2 kg ethylene diamine (EDA) with 4.56 kilograms (kg) of ε-caprolactone under a nitrogen blanket in a stainless steel reactor equipped with an agitator and a cooling water jacket. An exothermic condensation reaction between the ε-caprolactone and the EDA occurs which causes the temperature to rise gradually to 80 degrees Celsius (° C.). A white deposit forms and the reactor contents solidify, at which the stirring is stopped. The reactor contents are then cooled to 20° C. and are then allowed to rest for 15 hours. The reactor contents are then heated to 140° C. at which temperature the solidified reactor contents melt. The liquid product is then discharged from the reactor into a collecting tray. A nuclear magnetic resonance study of the resulting product shows that the molar concentration of C2C diamide dial in the product exceeds 80 percent. The melting temperature of the C2C diamide diol monomer product is 140° C.

Step (b): Contacting C2C monomer with dimethyl adipate (DMA):

A 100 liter single shaft Kneader-Devolatizer reactor equipped with a distillation column and a vacuum pump system is nitrogen purged, and heated under nitrogen atmosphere to 80° C. (based on thermostat). Dimethyl adipate (DMA; 38.324 kg) and C2C diamide diol monomer (31.724 kg) are fed into the kneader. The slurry is stirred at 50 revolutions per minute (rpm).

Step (c): Contacting C2C/DMA with 1,4-butanediol, distilling methanol and transesterification:

1,4-Butanediol (18.436 kg) is added to the slurry of Step (b) at a temperature of about 60° C. The reactor temperature is further increased to 145° C. to obtain a homogeneous solution. Still under nitrogen atmosphere, a solution of titanium(IV)butoxide (153 g) in 1.380 kg 1,4-butanediol is injected at a temperature of 145° C. into the reactor, and methanol evolution starts. The temperature in the reactor is slowly increased to 180° C. over 1.75 hours, and is held for 45 additional minutes to complete distillation of methanol at ambient pressure. 12.664 kilograms of methanol are collected.

Step (d): distilling 1,4-butanediol and polycondensation to give C2C50% polymer product.

Reactor dome temperature is increased to 130° C. and the vacuum system activated stepwise to a reactor pressure of 7 mbar (0.7 kiloPascals (kPa)) in 1 hour. Temperature in the kneader/devolatizer reactor is kept at 180° C. Then the vacuum is increased to 0.7 mbar (0.07 kPa) for 7 hours while the temperature is increased to 190° C. The reactor is kept for 3 additional hours at 191° C. and with vacuum ranging from 0.87 to 0.75 mbar. At this point a sample of the reactor contents is taken (Preparation 2A); melt viscosities were 6575 megaPascals (mPas) at 180° C. and 5300 mPas at 190° C. The reaction is continued for another 1.5 hours until the final melt viscosities are recorded as 8400 mPas at 180° C. and 6575 mPas at 190° C. (Preparation 2B). Then the liquid Kneader/Devolatizer reactor contents are discharged at high temperature of about 190° C. into collecting trays, the resultant C2C50% polymer is cooled to room temperature and grinded. The C2C50% polymer is a polyesteramide (PEA) polymer containing 50 mol percent of the C2C monomer.

Example 2

Using Azide Crosslinking Agent and C2C50% Polymer to Make a Membrane 5 g of C2C50% polymer and 0.6 g of bisazide A were dissolved in 20 mL of chloroform. Once dissolved, solution was cast onto 100 mm Teflon petri dish and covered to allow solvent to evaporate. After casting and drying, sample was placed in an oven at 130° C. and allowed to cure for 72 hours. Sample was then removed and allowed to cool to room temperature.

Example 3

Preparation of PEA Polymer Containing 18 Mole Percent of C2C Monomer (Polymer Herein Referred to as C2C18% Polymer)

Into a 1-neck 500 mL round bottom flask is loaded titanium (IV) butoxide (0.31 g, 0.91 mmol), N,N'-1,2-ethanediyl-bis [6-hydroxyhexanamide] (C2C monomer, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adaptor with Vigreux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr (60 kiloPascals (kPa)); 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.36 to about 0.46 Torr with the following schedule: 2 hours, 175° C.; 2 hours, to/at 190° C., and 3 hours to/at 210° C. The resultant PEA polymer product contains 18 mole percent of the C2C monomer.

Example 4

Using Azide Crosslinking Agent and C2C18% Polymer to Make a Membrane 2 g PEA-C2C18% polymer and 0.3 g of bisazide A were dissolved in 10 mL of chloroform. Sample was cast on to a porous polysulfone/polyethylene terephthalate support using an Automatic Drawdown Machine II, from Gardco with a Wire #5 casting rod from RD Specialties. Selective layer thickness was between 5 and 10 microns according to SEM. A section of the cast film and support was mounted on a metal sheet and then exposed to 90° C. for 6 minutes in an oven. The cured membrane sample was removed from the oven and allowed to cool to room temperature.

Example 5

Comparative: Using C2C18% Polymer to Make a Membrane Without Azide Crosslinking 2 g of PEA-C2C18% polymer were dissolved in 20 mL of chloroform. Once dissolved, sample is cast and dried using the casting method taught for Example 4 but without using an azide crosslinking agent.

Example 6

Performance Testing

Mixed Gas Selectivity Apparatus:
Use a mixed gas permeation system designed as shown in FIG. 1 of U.S. Patent Pub. No. Applicant's application having Ser. No. 61/424,735 titled CROSSLINKED SILANE-MODIFIED MOLECULARLY SELF-ASSEMBLING MATERIAL, filed Dec. 20, 2010, in the names of Matteucci et al., and as further described in the corresponding specification of this patent application. Reference numerals included in the following text are from such FIG. 1 and its corresponding description.

Mixed Gas Selectivity Procedure:
Using apparatus 10 of FIG. 1 at 20° C. and a feed gas composed of $CH_4$ gas and $CO_2$ gas where feed gas composition can be determined using the gas chromatograph 70, dispose a test plaque (membrane) 50 (prepared by the solution casting method as described herein) in gas permeation cell 40, and dispose the resulting gas permeation cell containing test plaque 50 inside of oven 30. Allow the mixed gas stream to flow into volume 41 and contact entrance face 51 of test plaque (membrane) 50. Remove permeation-resistant gases to permeation-resistant gas loop 61. Sweep permeant gas(es) (i.e., gases that have permeated through test plaque 50) away from the exit face 53 of test plaque (membrane) 50 and out of volume 43 of cell 40 using a He gas stream flowing at 5 milliliters per second (mL/s). The He gas sweeping allows for the test plaque (membrane) 50 to effectively operate as if its exit face 53 were exposed to a vacuum. Separately send some of permeation-resistant gas from volume 41 and swept permeant gas from volume 43 to a Model No. 5890 (Hewlitt Packard) gas chromatograph 70 to determine compositions thereof. Between testing with the different mixed gases, evacuate the upstream and downstream volumes in the cell using a vacuum pump for at least 16 hours at 20° C. Mixed gas selectivities were calculated according to EQ-a shown above, where component A is $CO_2$ and component B is methane.

Industrial gas separations are generally run at high $CO_2$ pressures, which causes plasticization in most polymers. This plasticization causes a loss in selectivity, which often renders polymeric membranes inappropriate for a separation. Also, many industrial processes require separations to be conducted at elevated temperatures, such as 50° C. The bis-azide crosslinked membranes exhibit improved resistance to plasticization than non-chemically crosslinked polymers and even better performance than polymers chemically crosslinked via other functionality such as via silane functionality.

Shown in Table 1 is the mixed gas $CO_2/CH_4$ selectivities for the membranes made from the following materials, respectively: PEA-C2C18% polymer, bisazide thermally cured PEA-C2C18% polymer, and bisazide thermally cured PEA-C2C50% polymer. Selectivity was determined, at 50° C. and a $CO_2$ pressure differential of 80 psi.

TABLE 1

| Polymer(s) used to make membrane | Example # | Mixed gas $CO_2/CH_4$ selectivity |
|---|---|---|
| PEA-C2C18 %, | Example 5 | 3.3 |
| Thermally Cured Bisazide PEA-C2C18 % | Example 2 | 7.8 |
| Thermally Cured Bisazide PEA-C2C50 % | Example 4 | 7.6 |

Example 7

Figure 2:
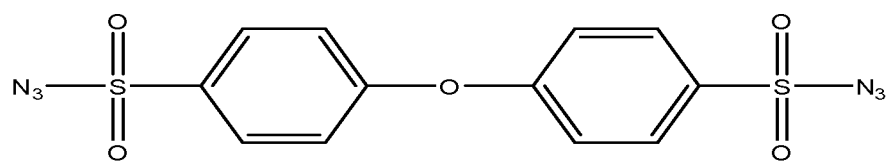
FIG. 2 shows the structure of 4,4'-oxybisphenylsulfonazide (BSA).

PELLETHANE® 2102-75A, a commercially available thermoplastic polyurethane-based polycaprolactone polyol, was tested as a possible membrane candidate. PELLETHANE® 2102-75A was reacted with 4,4'-oxybisphenylsulfonazide (BSA). The structure of 4,4'-oxybisphenylsulfonazide (BSA) is shown below in FIG. 2.

Thin Film Production
Two grams of PELLETHANE® 2102-75A and a specified weight of bisazide were dissolved in 20 mL of tetrahydrofuran (THF). Once dissolved, the sample was cast onto a porous support (obtained from the Dow Chemical Company) using an Automatic Drawdown Machine II (obtained from GARDCO® Paul N. Gardner Company, Inc., Pompano, Fla.) with a Wire #4 casting rod from RD Specialties, Webster, N.Y. The support was allowed to dry at ambient conditions prior to use. The drawdown machine was used with a vacuum plate to cause the support to remain flat during casting. The support was initially placed on the vacuum plate while a weak vacuum was being pulled. In order to maintain sufficient vacuum to keep the support flat against the plate, the sides of the support were taped down against the sides of the vacuum plate. The tape was arranged such that it did not go onto the casting face of the plate. Once the support was properly secured, the casting rod was placed in front of the drawdown arm. The drawdown distance was tested to make sure the desired casting area would be covered. The system was reset, and the polymer solution was poured in front of the casting rod, and casting was initiated.

After the drawdown arm came to a stop, the bar was removed from the support surface and wiped down with a paper towel. The bar was then set in a large graduate cylinder filled with chloroform to remove remaining polymer. Excess polymer solution was removed from the support using a paper towel. The thin film was dry by the time the bar and excess polymer solution had been removed. This process generally results in film thickness on the order of 10 microns.

UV Crosslinking

For a set period of time (i.e., 60 seconds) thin supported films of bisazide filled PELLETHANE® 2102-75A were exposed to 254 nm UV light using a SPECTROLINE® Model XX-15F lamp, Spectroline Corporation, Westbury, N.Y.

Determination of Selectivity of Membrane by High Pressure Mixed Gas Permeation

A mixed gas apparatus was used for mixed gas permeation experiments at or above pressures of 400 psig. The feed gas was purchased from AIRGAS®, Inc., Chicago, Ill., and is composed of 45:45:5:5 $CO_2:CH_4:C_2H_6:C_3H_8$ at 650 psig. In this system permeate is swept away from the downstream side of the membrane using a He gas stream flowing at 5 milliliters per second (mL/s) The He gas sweep allows for the test membrane to effectively operate as if the downstream surface were exposed to a vacuum. Some of the permeate gas is sampled to an AGILENT® 6890 gas chromatograph (obtained from AGILENT® Technologies, Inc., Wilmington, Del.) to determine composition. Mixed gas selectivities were calculated according to EQ-a shown above, where component A is $CO_2$ and component B is methane, ethane, or propane.

Results:

Example 7-A

A commercial polyurethane, PELLETHANE® 2102-75A, was used for this example. The membrane had a $CO_2/CH_4$ mixed gas selectivity and $CO_2/C_2H_6$ selectivity below 3 under the conditions described above (i.e., 400 psig $CO_2:CH_4:C_2H_6:C_3H_8$ at a ratio of 45:45:5:5 and at 10° C.).

Figure 3:
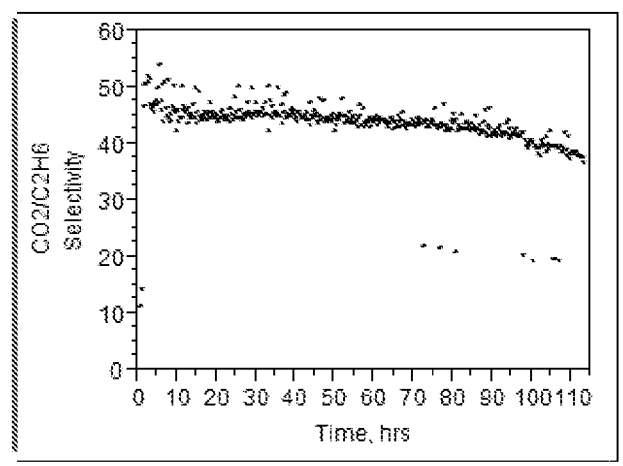
FIG. 3 shows mixed gas selectivity for PELLETHANE® 2102-75A containing 0.1 wt % BSA after exposure to 60 s UV.
Figure 4A:
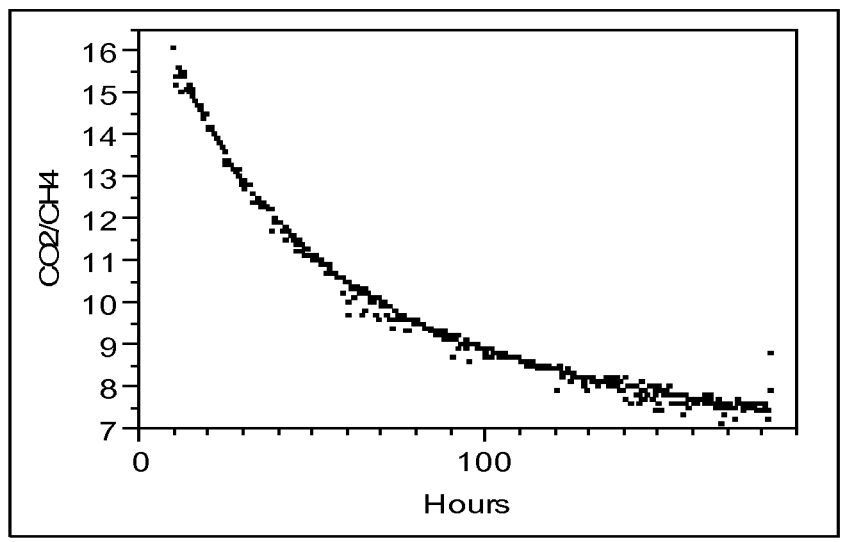
FIG. 4A shows $CO_2/CH_4$ gas selectivity with respect to Example 7B for PELLETHANE® 2102-75A containing 0.025 wt % BSA after exposure to 120 s UV.
Figure 4B:
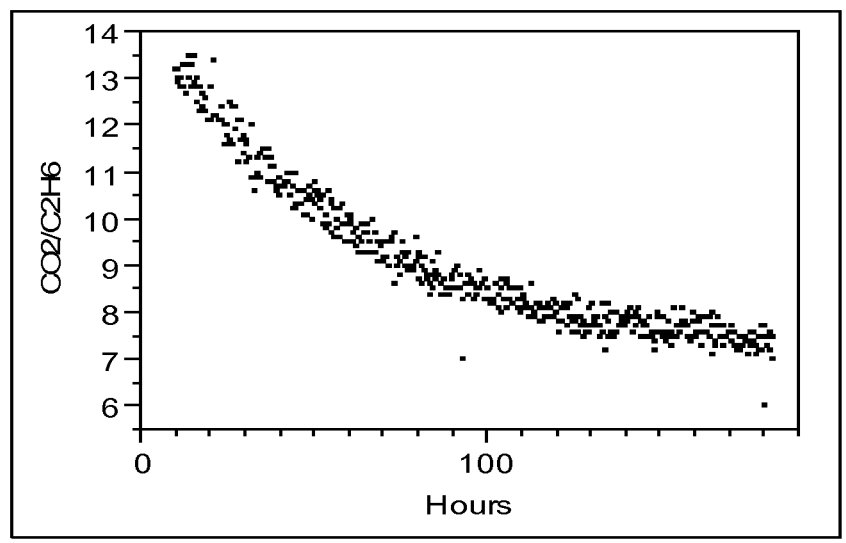
FIG. 4B shows $CO_2/C_2H_6$ gas selectivity with respect to Example 7B for PELLETHANE® 2102-75A containing 0.025 wt % BSA after exposure to 120 s UV.
Figure 4C:
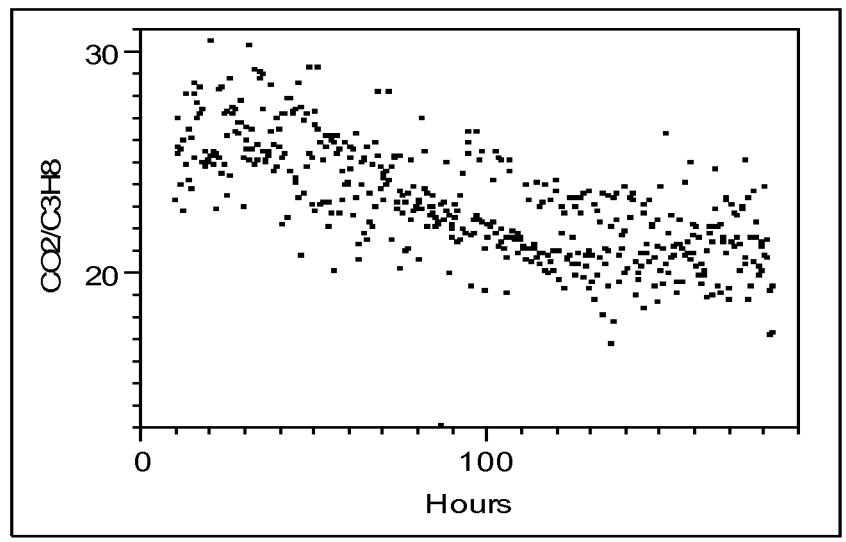
FIG. 4C shows $CO_2/C_3H_8$ gas selectivity with respect to Example 7B for PELLETHANE® 2102-75A containing 0.025 wt % BSA after exposure to 120 s UV.
Figure 5A:
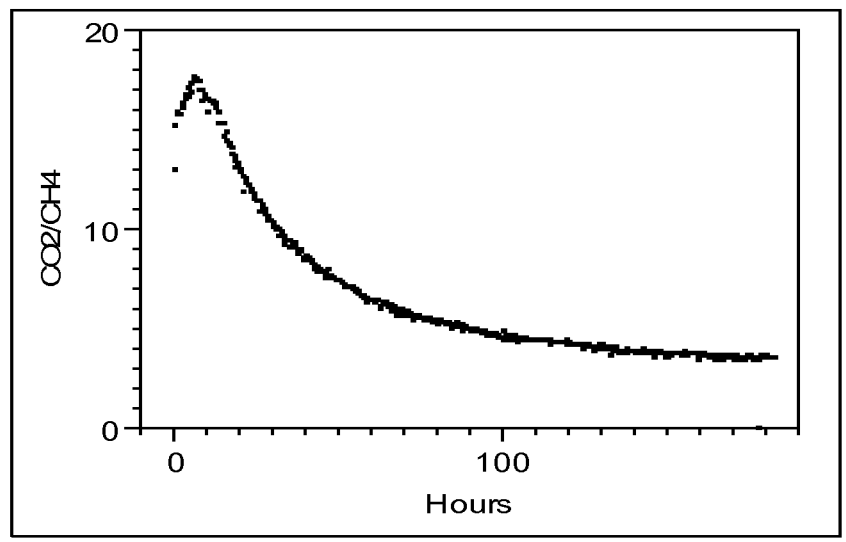
FIG. 5A shows $CO_2/CH_4$ gas selectivity with respect to Example 7C for PELLETHANE® 2102-75A containing 4 wt % BSA after exposure to 120 s UV.
Figure 5B:
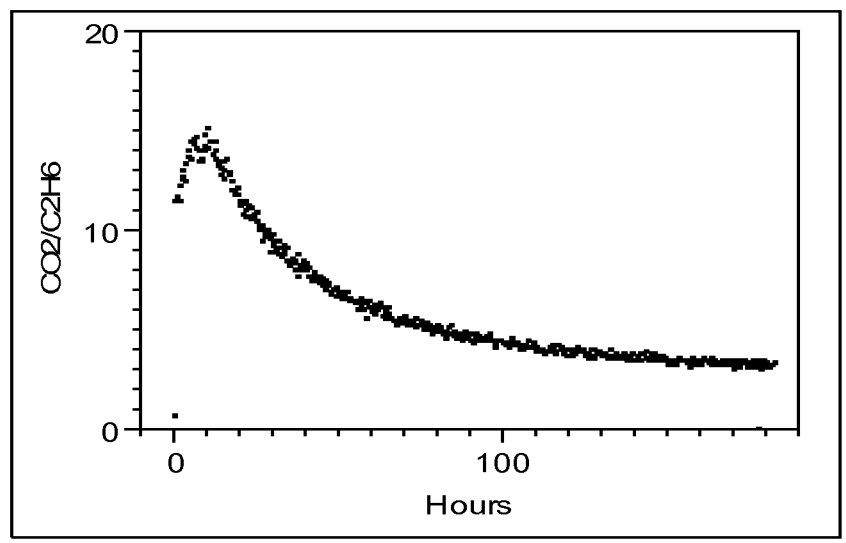
FIG. 5B shows $CO_2/C_2H_6$ gas selectivity with respect to Example 7C for PELLETHANE® 2102-75A containing 4 wt % BSA after exposure to 120 s UV.
Figure 5C:
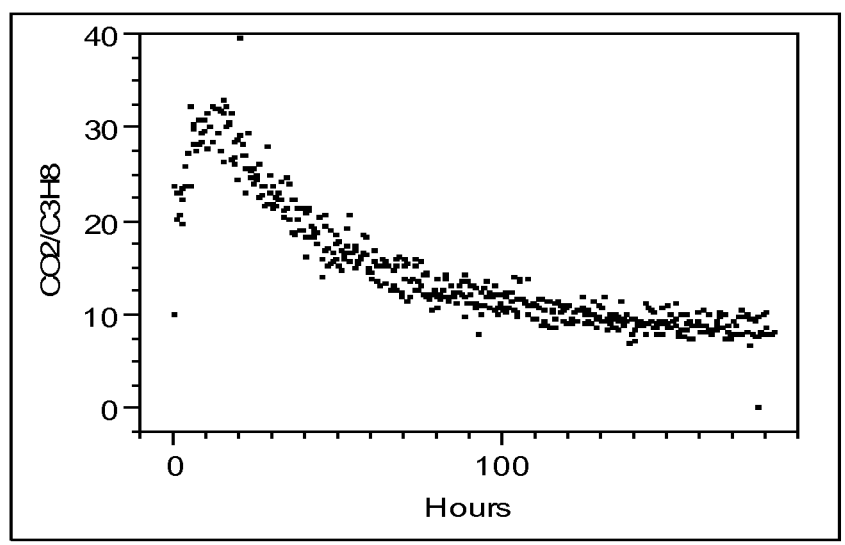
FIG. 5C shows $CO_2/C_3H_8$ gas selectivity with respect to Example 7C for PELLETHANE® 2102-75A containing 4 wt % BSA after exposure to 120 s UV.

FIG. 3 presents, mixed gas selectivity for PELLETHANE® 2102-75A containing 0.1 wt % BSA after exposure to 60 s UV. Although, the $CH_4$ flux was too low to resolve in the GC used in this study, the $CO_2$/ethane selectivity is around 40 over a period of over 100 hours. This demonstrates that azide crosslinking can improve mixed gas selectivity for PELLETHANE® 2102-75A. In FIG. 3, the selectivity is shown for the mixed gas of $CO_2$/ethane with respect to PELLETHANE® 2102-75A containing 0.1 wt % BSA after exposure to 60 s UV. Feed composition was 400 psig $CO_2:CH_4:C_2H_6:C_3H_8$ at a ratio of 45:45:5:5 and at 10° C.

Although propane has been included as a feed gas in the permeation experiments listed above, it has generally been present in the permeate at a concentration that is near the resolution limit for the GC. As such, $CO_2/C_3H_8$ selectivity is often at or above 100.

Example 7-B $CO_2$/hydrocarbon mixed gas selectivity for PELLETHANE® 2102-75A containing 0.025 wt % BSA after exposure to 120 s UV. Feed composition was 400 psig $CO_2:CH_4:C_2H_6:C_3H_8$ at a ratio of 45:45:5:5 and at 10° C.

Example 7-C $CO_2$/hydrocarbon mixed gas selectivity for PELLETHANE® 2102-75A containing 4 wt % BSA after exposure to 120 s UV. Feed composition was 400 psig $CO_2:CH_4:C_2H_6:C_3H_8$ at a ratio of 45:45:5:5 and at 10° C.

The complete disclosures of the patents, patent documents, technical articles, and other publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of making a membrane comprising:
   a) forming a solution comprising:
      i) a curable composition comprising:
         A) a thermoplastic polyurethane; and
         B) at least one azide crosslinking agent comprising two or more azide moieties that are co-reactive with the thermoplastic polyurethane, wherein the azide crosslinking agent is present in an amount of no more than 15 wt. % of the total curable composition;
      ii) a solvent; and
      iii) a non-solvent;
   b) conducting a phase inversion of the solution to form a membrane structure; and
   c) exposing the membrane structure to ultraviolet or electron beam radiation so as to substantially cure the membrane structure and form a membrane.

2. The method of claim 1 wherein at least a portion of the membrane has an acid gas to hydrocarbon gas selectivity of at least 5 at a temperature of 10° C., wherein the membrane has a first major surface and a second major surface, and wherein selectivity is $$\alpha_{A/B}$$

and selectivity is determined according to equation (EQ-a):

$$\alpha_{A/B} = \frac{x_A/y_A}{x_B/y_B} \quad \text{(EQ-a)}$$

wherein $y_A$ and $y_B$ are the molar concentrations of the acid gas and the hydrocarbon gas, respectively, in a mixed gas feed having a first pressure and that is proximal to the first major surface of the membrane, and $x_A$ and $x_B$ are the molar concentrations of acid gas and hydrocarbon gas, respectively, in a permeate gas mixture having a second pressure and that is proximal to the second major surface of the membrane, wherein the first pressure is greater than the second pressure.

3. The method of claim 1, wherein the thermoplastic polyurethane has at least one thermal transition temperature and wherein the membrane structure is at a temperature below one or more of the thermal transition temperatures for at a least a portion of the time period that the membrane structure is exposed to ultraviolet or electron beam radiation-so as to substantially cure the membrane structure and form a membrane.

4. The method of claim 1, wherein the membrane structure is at a first temperature for at least a portion of the forming time period, wherein the thermoplastic polyurethane has one or more thermal transition temperatures that are greater than the first temperature, and wherein the membrane structure is at a temperature below the one or more thermal transition temperatures that are greater than the first temperature for at a least a portion of the time period that the membrane structure is exposed to ultraviolet or electron beam radiation so as to substantially cure the membrane structure and form a membrane.

5. The method of any preceding claim, wherein the membrane comprises a first region adjacent to a second region, wherein the first region has a thickness of 10 micrometers or less and an acid gas to hydrocarbon gas selectivity of at least 5 at a temperature of 10° C., wherein the second region is permeable to fluid, wherein the membrane has a first major surface and a second major surface, and wherein selectivity is $\alpha_{A/B}$ and selectivity is determined according to equation (EQ-a):

$$\alpha_{A/B} = \frac{x_{A/y_A}}{x_{B/y_B}} \quad \text{(EQ-a)}$$

wherein $y_A$ and $y_B$ are the molar concentrations of the acid gas and the hydrocarbon gas, respectively, in a mixed gas feed having a first pressure and that is proximal to the first major surface of the membrane, and $x_A$ and $x_B$ are the molar concentrations of acid gas and hydrocarbon gas, respectively, in a permeant gas mixture having a second pressure and that is proximal to the second major surface of the membrane, wherein the first pressure is greater than the second pressure.

6. The method according to claim 1, wherein the azide crosslinking agent comprises a compound represented by the following formula

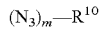

wherein m is 1 to 6 and $R^{10}$ is an m-valent moiety that may be aryl or nonaryl: saturated or unsaturated; linear or branched or cyclic; and/or substituted or unsubstituted.

7. The method according to claim 1, wherein the azide crosslinking agent comprises a compound represented by the following formula

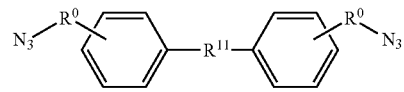

wherein each $R^o$ and $R^{11}$ independently is a divalent linking group that may comprise a heteroatom such as one or more of O, S, or P and that may be linear, branched, cyclic, polycyclic, fused ring, or the like; with the proviso that each $R^o$ independently may be a single bond.

8. The method according to claim 1, wherein the azide crosslinking agent comprises a substituted or unsubstituted material according to the formula $N_3-(R^{13}O)_q-R^o-N_3$, wherein q is independently 1 to 10, $R^{13}$ is independently a divalent alkylene moiety that may be linear, branched, cyclic, or polycyclic, and $R^o$ independently is a divalent linking group that may comprise a heteroatom such as one or more of O, S, or P and that may be linear, branched, cyclic, polycyclic, fused ring, or the like; with the proviso that $R^o$ independently may be a single bond.

9. The method of claim 1, wherein the thermoplastic polyurethane is based on polycaprolactone polyol.

10. The method according to claim 9, wherein the thermoplastic polyurethane comprises a poly(ester-urethane).

* * * * *